United States Patent [19]
Rez

[11] Patent Number: 5,184,917
[45] Date of Patent: * Feb. 9, 1993

[54] METHOD OF HYDROCARBON DECONTAMINATION

[75] Inventor: Donald H. Rez, Anaheim, Calif.

[73] Assignee: Polar Marine, Inc., Anaheim, Calif.

[*] Notice: The portion of the term of this patent subsequent to Apr. 21, 2009 has been disclaimed.

[21] Appl. No.: 867,488

[22] Filed: Apr. 13, 1992

Related U.S. Application Data

[63] Continuation-in-part of Ser. No. 552,942, Jul. 16, 1990, Pat. No. 5,106,424.

[51] Int. Cl.$^5$ .............. B09B 3/00; B28B 1/14; E01C 3/00
[52] U.S. Cl. ............... 405/128; 52/DIG. 9; 106/669; 106/718; 106/807; 106/900; 210/922; 210/923; 264/35; 264/40.1; 264/259; 264/274; 264/279; 264/297.9; 264/333; 404/29; 404/34; 404/73; 404/82; 405/266
[58] Field of Search ......... 264/33, 34, 35, 333, 264/40.1, 259, 274, 279, 297.9; 52/DIG. 9, 742; 405/15–17, 128, 258, 263, 266; 106/647, 664, 669, 718, 807, 900; 134/4, 10; 210/908, 922, 923; 404/18, 29, 34, 44, 45, 73, 76, 82, 99, 28

[56] References Cited

U.S. PATENT DOCUMENTS

| Re. 27,227 | 11/1971 | Harnsberger . | |
|---|---|---|---|
| 1,000,545 | 8/1911 | Page . | |
| 2,344,206 | 3/1944 | Forni | 264/336 X |
| 3,802,898 | 4/1974 | Laurent et al. . | |
| 3,868,262 | 2/1975 | Ohlson . | |
| 4,057,608 | 11/1977 | Hashimoto et al. | 264/333 X |
| 4,094,697 | 6/1978 | Rostler . | |
| 4,225,359 | 9/1980 | Schneider | 106/900 X |
| 4,250,134 | 2/1981 | Minnick | 264/333 X |
| 4,274,880 | 6/1981 | Chappell . | |
| 4,329,179 | 5/1982 | Kutta | 106/697 X |
| 4,375,489 | 3/1983 | Muszynski | 89/36.02 X |
| 4,789,244 | 12/1988 | Dunton et al. . | |
| 4,795,590 | 1/1989 | Kent et al. | 252/315.3 X |
| 4,795,764 | 1/1989 | Alm et al. | 521/121 X |
| 4,859,367 | 8/1989 | Davidovits | 264/333 X |
| 4,885,880 | 12/1989 | Sudrabin et al. | 220/457 X |
| 4,900,196 | 2/1990 | Bridges | 405/131 X |
| 4,931,192 | 6/1990 | Covington et al. . | |
| 5,032,328 | 7/1991 | Griffis | 204/333 X |
| 5,106,424 | 4/1992 | Rez | 210/922 X |

FOREIGN PATENT DOCUMENTS 1463297 2/1977 United Kingdom ............... 264/30

OTHER PUBLICATIONS

Takeshita, oil-sludge solidification, *Chemical Abstracts*, vol. 92, 1980, p. 308 (220431f).

*Primary Examiner*—Karen Aftergut
*Attorney, Agent, or Firm*—William W. Haefliger

[57] ABSTRACT

The method of treating a waste liquid or solid hydrocarbon to reduce risk of environmental contamination by the waste hydrocarbon, that includes forming a flowable cementitious paste of Portland cement and additives; introducing the hydrocarbon into the mix and distributing the hydrocarbon therein; forming the mix into a shape for curing, and allowing the formed mix to cure so as to encapsulate the hydrocarbon in the cured concrete mix.

21 Claims, 4 Drawing Sheets

METHOD OF HYDROCARBON DECONTAMINATION

This application is a continuation-in-part of Ser. No. 552,942 filed Jul. 16, 1990, now U.S. Pat. No. 5,106,424.

BACKGROUND OF THE INVENTION

This invention relates generally to petroleum decontamination, and more particularly to encapsulation of polluting petroleum hydrocarbons in distributed state in cementitious mixes which are cured into selected useful shapes.

Hydrocarbon contamination of beach, shore, and similar areas has recently become more and more of a problem, due for example to spillage and leakage of crude oil and other hydrocarbons from tankers, off-shore oil platforms and facilities, and underground and surface pipe lines, and the like. Much time and great expense are wasted in carrying out state-of-the-art remedies, such as steam cleaning and processing of rocks, sand, shore lines, and soil microbiol conversions of crude to $O_2$ and to $CO_2$, and general mop-up, including transporting contaminated soil or sand to remote areas, for encapsulation. There is need for a much more efficient and useful means to decontaminate such areas. There is need, in general, to encapsulate and dispose of liquid or solid hydrocarbon contamination wherever found.

SUMMARY OF THE INVENTION

It is a major object of the invention to provide methods and apparatus fulfilling the above need. As will be seen, the basic method of the invention includes the steps:

a) preparing a flowable cementitious aqueous paste (Portland cement, water and chemical additions to enhance bonding), b) then introducing the petroleum polluted sand and/or soil into the paste and distributing it therein to form a mix, c) forming the resultant concrete mix into a shape for curing, and d) allowing the formed mix to cure so as to encapsulate the petroleum or derivative hydrocarbon in the cured concrete mix.

Concrete resulting from the cured mix contains within itself, or encapsulates, the objectionable hydrocarbon, removed from areas such as beach sand, soil under petroleum or petroleum derivative hydrocarbon storage tanks, or other soil or sand areas; and it can then be used for useful purposes, as in production of roadways, blocks, foundations for buildings, erosion control, marine and sub-marine structures. The contaminated sand or soil can be substituted for sand in a conventional concrete mix, after it has been scooped from a source area, as for example a beach area, leaving only fresh, uncontaminated sand at the beach, thus protecting the aquifer system and ecological growth and life.

It is another object of the invention to provide foam capable of preventing evaporation of vaporous airborne polluting elements, and capable of emulsifying hydrocarbon. As will be seen, the foam may be brought into contact with the contaminated sand or soil medium, for contacting and at least partially emulsifying the waste petroleum hydrocarbon distributed in the medium. A pile or mound of such soil or sand media may be formed, and the emulsifying foam may be pumped, sprayed or otherwise flowed onto the pile to contact and emulsify hydrocarbon distributed therein, prior to use of the media in a concrete mix.

The contaminated media may be recovered by excavating the media from a hydrocarbon contaminated underground formation in the earth. Thus, the media to be disposed of may, for example, have been located beneath a hydrocarbon storage container, as at a fueling station, and the excavating step may include gaining access to the contaminated underground formation, and scooping it and forming a pile of the scooped media. The invention also contemplates forming of an underground vault as a secondary or other containment for the storage vessel.

Yet another object is to form the mix into block shape for curing into solid blocks. Such blocks may be located in a row to form supports, for forming a road pavement over the blocks. Block suspending supports may be located in the block-shaped mix, prior to curing, for block lifting and positioning. Steel reinforcing bars may be used for this purpose. These blocks can be formed and cast within a plastic envelope to prevent future release of contaminants, and if leakage is detected, the blocks can be excavated and hauled to a safe space for storage.

It is still another object of the invention to use the hydrocarbon containing concrete in a way such as will isolate other contaminated areas. Thus, for example, that concrete may then be poured into or over another hydrocarbon contaminated beach or counterpart area, to cure in situ over said contaminated area. That pour area is typically defined by hydrocarbon contaminated rock or the like, as at a sea wall, groin, or spit. The concrete is typically pumped to the rocky area and discharged onto the rock to cover oil contaminated zones and to cure in situ.

A further object is to provide an alternate method to cover or isolate hydrocarbon contaminated rocks or sloping areas adjacent the sea or beach, as by employment of a sleeve overlying the contaminated area, and pumping or discharging the hydrocarbon containing concrete into the sleeve to fill or partially fill same, to cure in situ, whereby the oil contaminated rock is permanently covered. Vegetation may then propagate as on the new concrete surface; and leakage from the sealed-in surface would not kill or prevent growth of such vegetation.

These and other objects and advantages of the invention, as well as the details of an illustrative embodiment, will be more fully understood from the following specification and drawings, in which:

DRAWING DESCRIPTION

DETAILED DESCRIPTION

Figure 1:
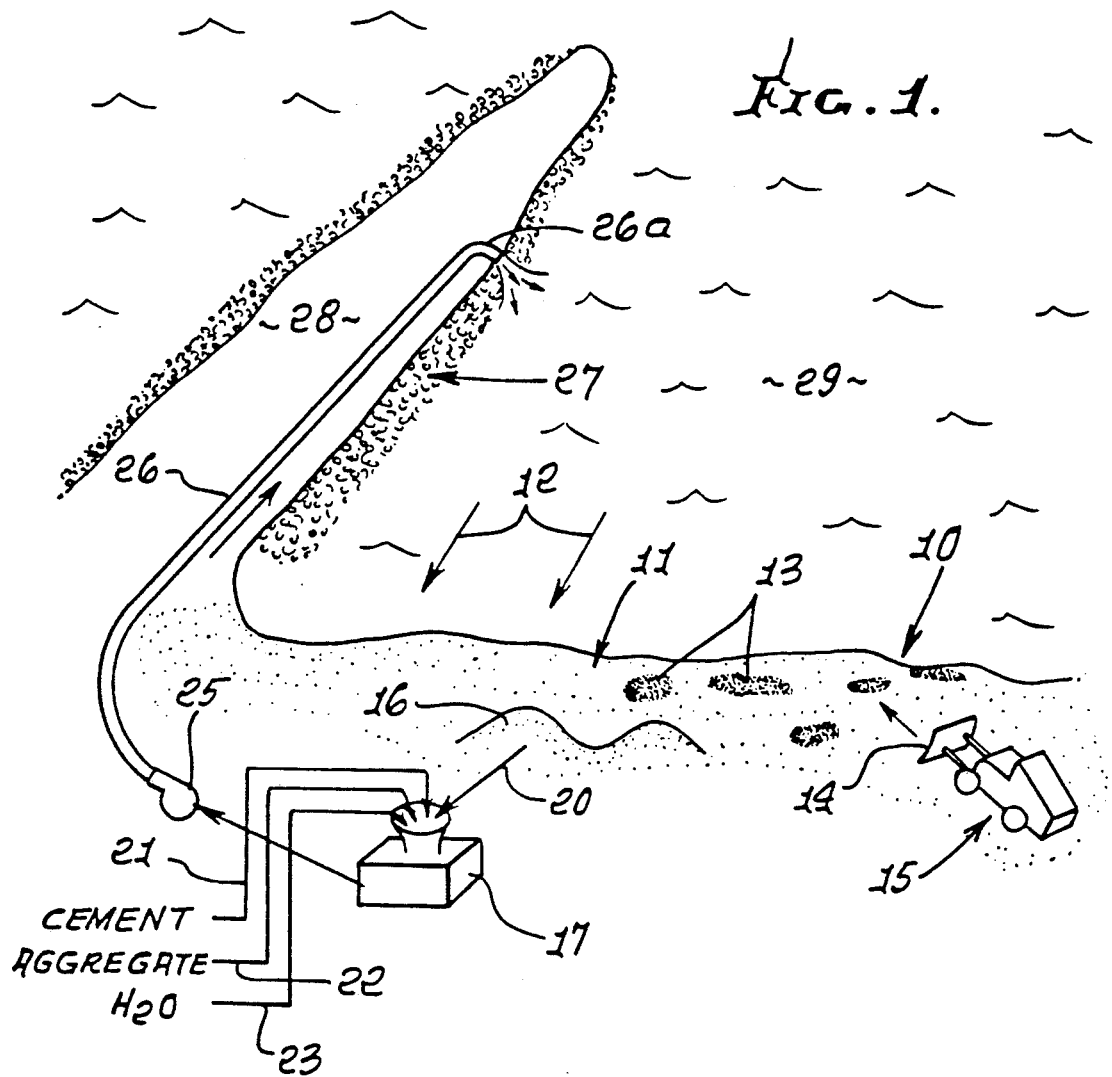
FIG. 1 is perspective view of a sea-shore location, at which contaminated sand is converted to concrete, and also showing use of such concrete to further isolate contaminated area.

In FIG. 1, a shore-line 10 is sandy at 11, and has become crude oil or hydrocarbon contaminated due to on-shore oil wave action, or impingement, as indicated by arrows 12. Note crude patches or zones 13 on or in the sand. A scoop or shovel 14 is moved over the beach, as by tractor 15, to scoop up the contaminated sand into a pile at 16 above high tide level, for example.

A concrete ready mixer is provided at 17 (as for example a truck), near the pile 16, and measured quantities of such contaminated sand from the pile are fed at 20 to the mixer. The latter is pre-charged at any nearby batch plant with calcareous cement at 21, a small amount of aggregate (rocks, etc.) at 22, and fresh or salt water at 23, and agitated. This allows the cement to be thoroughly water-wetted prior to any contact with oily sand, etc., as oil can inhibit such wetting, which is required for proper curing. The components fed to the mix are sufficient, and in correct proportion, to form a curable slurry or mixture, and the concrete may be used to form roadways, foundations, building blocks, broken up pieces used as sea barriers, etc. Use of synthetic fiber, such as polypropylene, in the slurry, adds reinforcement and strength.

Figure 2:
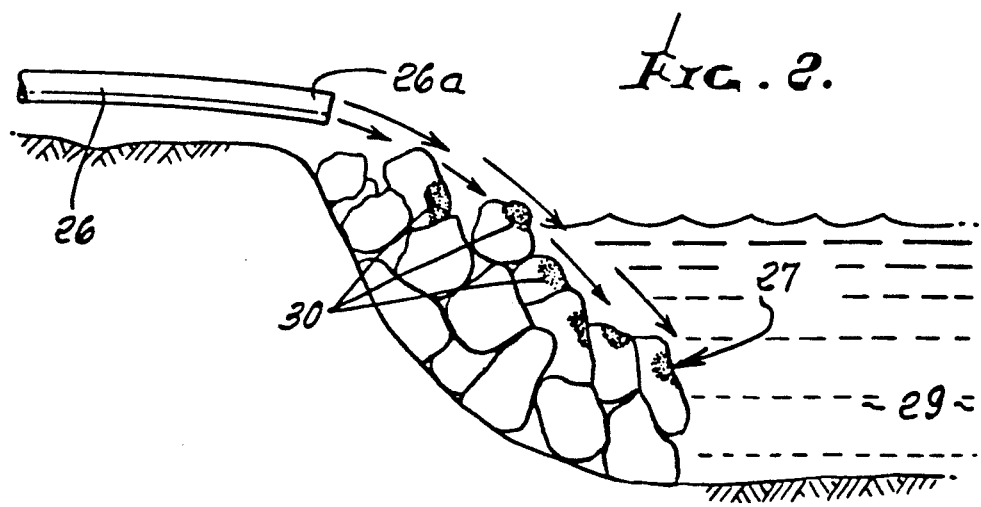
FIG. 2 is an elevation showing a concrete pour onto crude-oil contaminated rocks.

FIG. 1 also shows use of the concrete in the following manner. A pump 25 is operated to pump concrete from the mixer to a tubular line 26, extending to another contaminated shore area, for example rocky area 27 adjacent a groin, spit, wharf, sea wall, etc. In the example, a groin 28 is shown, extending into the sea 29. Line 26 delivers concrete slurry onto the rocks, as seen in FIG. 2, to be accomplished at low tide, thereby covering oily patches or zones 30 seen on the rocks. The concrete cures in situ, permanently covering or isolating the oily patches of contamination. Pneumatic transportation of the concrete in line 26 may be employed, and the concrete discharged in a jet, onto the shore area.

Figure 3:
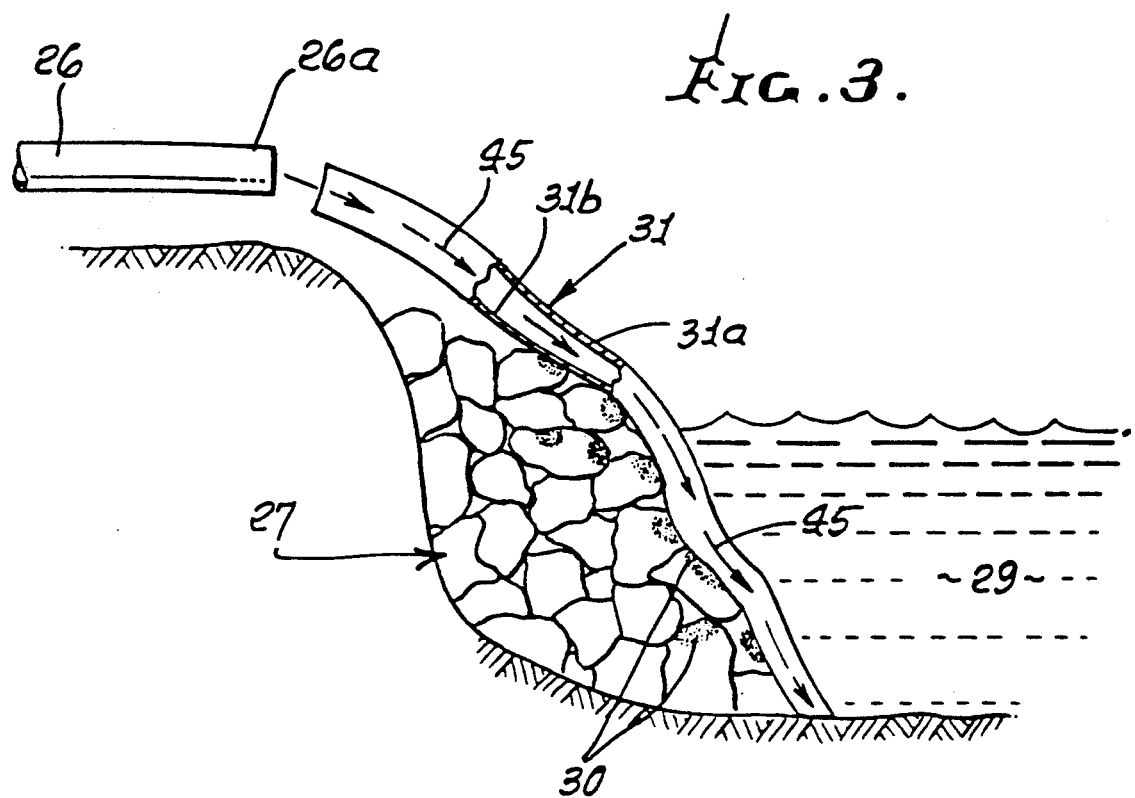
FIG. 3 is a view like FIG. 2 showing a concrete pour into a locating or forming sleeve, on the oil contaminated rocky shore.

In FIG. 3, a plastic, i.e., synthetic resinous sleeve 31, is provided, overlying the rocks and oily patches. Concrete is poured or delivered from end 26a of line 26, into the flexible sleeve to fall by gravity to lower regions of the sleeve at ocean edge, or below that level. Thus advantage is taken of a gravity-fill, to fill the sleeve with concrete 45 to desired level, and the sleeve is self-supporting on the rocks, and has an undulating appearance due to weight of concrete depressing the sleeve toward crevices between the rocks. Sleeve upper and lower layers or sheets appear at 31a and 31b. The sleeve may consist of biodegradable flexible material, if desired. This method may be used when sea conditions may wash away the exposed poured concrete before it sets or gains strength to resist wash-away.

Figure 4:
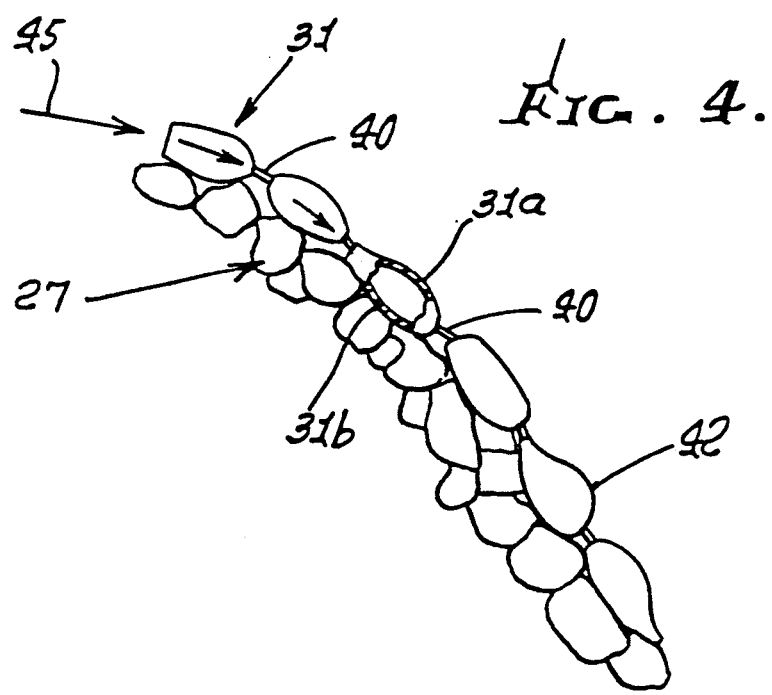
FIG. 4 is a cross-section through a sleeve that has opposite sheets interconnected at local zones that are spaced apart.

In FIG. 4, the sleeve upper and lower sheets are locally interconnected, as by heat bonding, at spaced apart locations 40, allowing concrete to flow within and fill the sleeve, between the interconnection zones, flowing around the latter. Thus, sleeve bulging as it fills with concrete is controlled, as by bulge areas 42, of controlled thickness. Various means for producing the interconnections may be provided. Such smaller concrete-filled zones, spaced apart, are self-accommodating to space between rocks, to stay in place when struck by waves.

The invention facilitates constructing stabilizing sea walls o artificial reefs off shore. The crude petroleum will be encapsulated in the concrete, and small amounts possibly released will not upset the ecology any more than the natural seepage from deposits off shore. The formation of reefs can be done by pumping the concrete, adjusted to the most effective weight for casting into preforming molds of a thin strong membrane (biodegradable if desired) to help anchoring and propagating shapes and structures constructed. To encourage wild life growth on existing jettys or groins, a gunite or pneumatic placed concrete could cover the crude coating on the jettys and to lock it in, allowing immediate return of sea life to the structure.

As also referred to, the invention is concerned with the method of treating waste hydrocarbon to reduce risk of environmental contamination, the method including the steps:

a) forming a flowable calcareous cementitious aqueous paste, as referred to, b) then introducing the petroleum contaminated sand or soil into the paste and distributing it therein to form a mix, c) forming the resultant concrete x into a shape for curing, and d) allowing the formed mix to cure so as to encapsulate the petroleum or derivative hydrocarbon in the cured concrete mix.

As will be seen, the mix typically includes Portland cement, water and at least one of the following:

i) sand ii) soil iii) soil and sand iv) small rocks or pebbles, proportioned to form a hardenable or curable concrete. The mix may also contain small amounts of additives, such as wetting polymers (polyvinyl acetate, for example) and air entraining agents. The use of such mixes to encapsulate liquid or solid pieces, or particles, or globules, of contaminant hydrocarbon is believed new in accordance with the present invention. Such hydrocarbons may include: crude petroleum, tar pieces, diesel fuel, gasoline, etc. Encapsulation of contaminant petroleum, and its derivatives, are of special importance.

Typically, the hydrocarbon is distributed in a flowable o distributable (comminuted) medium, such as soil, sand, and mixtures of sand.

Figure 5:
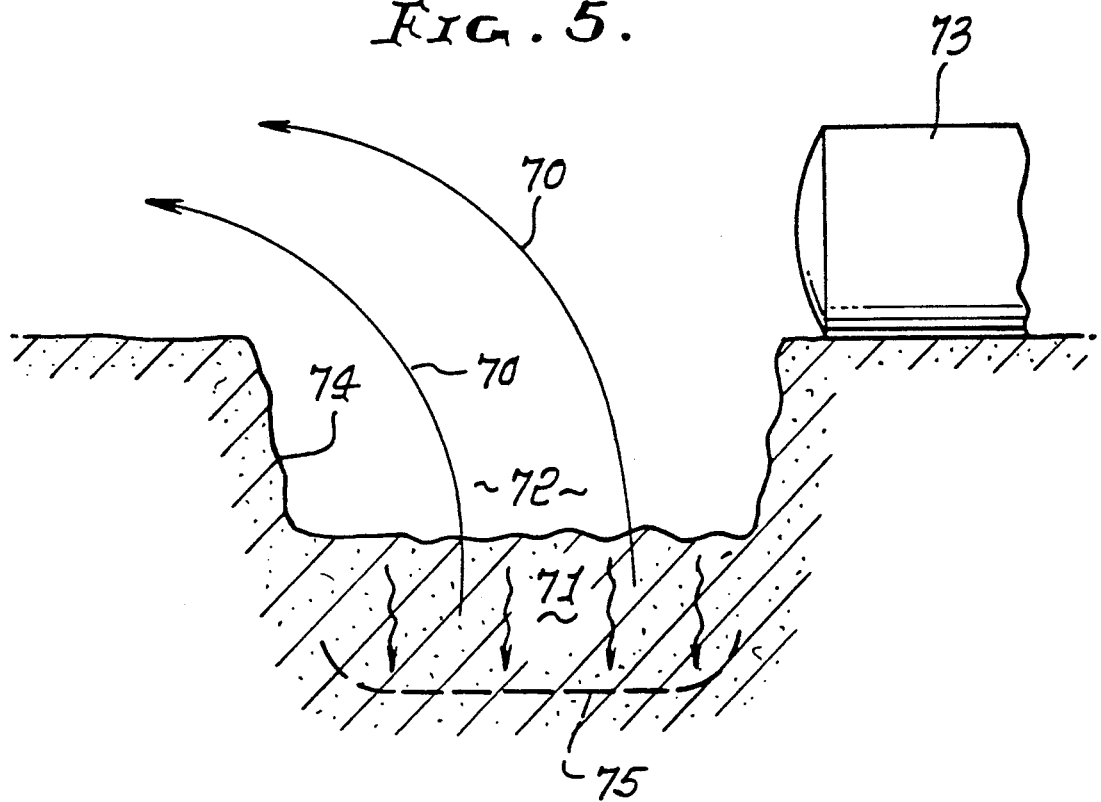
FIG. 5 is a vertical section taken through the earth formation showing hydrocarbon contaminated soil removal.

FIG. 5 shows excavation of such contaminated media (see arrows 70) from an underground formation. The latter is shown as contaminated earth 71 beneath a zone 72 from which a leaky steel storage tank 73 (for hydrocarbon liquid) has been removed. Excavation of the tank and sidewardly surrounding earth 74 gives access to the media 70 in the earth formation below zone 72. That media is scooped out down to a level as indicated at 75 (the bottom of the contamination in the earth), and placed in a pile, as seen at 77 in FIG. 6.

Figure 6:
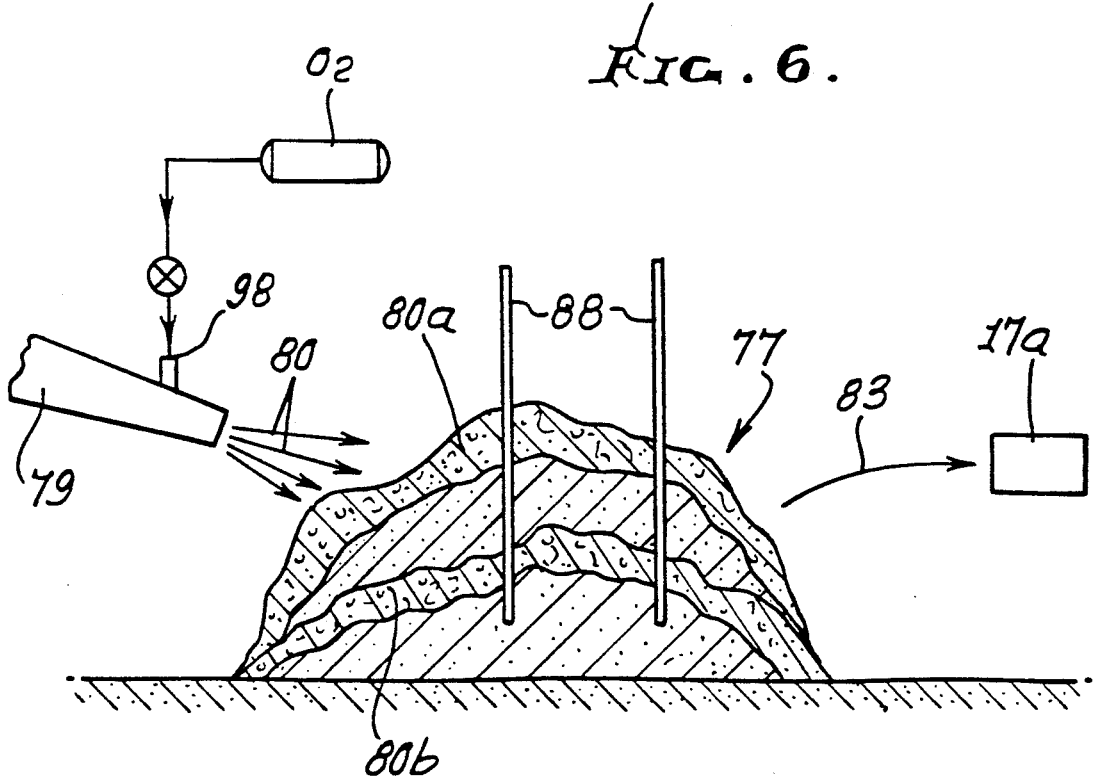
FIG. 6 is a vertical section showing emulsifying foam treatment of a cementitious slurry or mix that contains distributed hydrocarbon.

FIG. 6 also shows provision and use of a hydrocarbon emulsifying foam 80 dispensed onto the pile 77, for penetration into the loose sandy or soil media, to treat and emulsify the distributed contaminating waste hydrocarbon. This enhances the compatibility of the hydrocarbon with the concrete mix to be prepared, as in FIG. 1. The foam may be dispensed into layers 80a and 80b in or on the pile 77, to allow layers of materials gathered at low tide to be held until wind and wave action has cleaned the surface of the water body. Arrow 83 shows delivery of the foam treated mix to the concrete forming station 17a. The media in the pile 77 is typically sampled, as shown by sampling rods 88 to determine the extent of hydrocarbon emulsification in the foam, whereby the amount of foam dispensed at 79 can be determined. The foam is concrete compatible, as for example is disclosed in U.S. Pat. No. 4,789,244, and may be selected as disclosed in that patent, to enhance the concrete properties (lightweight, etc.), via use of a foaming agent, such as CELLUCON (methyl cellulose), AC-645 or AC-900 Foam Product, produced by Rusmar Inc., West Chester, Pa. may be used. Thus, the use of foam, as described, has multiple beneficial functions, among which is enhancement of the environment by way of aiding encapsulation of the contaminant hydrocarbon. Oxygen addition to the foam is shown at 98, to enhance foam formation. The foam aids wetting of concrete and mix particles; it surrounds the hydrocarbons to block escape of aromatics into the air; and it acts to plasticize the concrete to reduce need for water.

Figure 7:
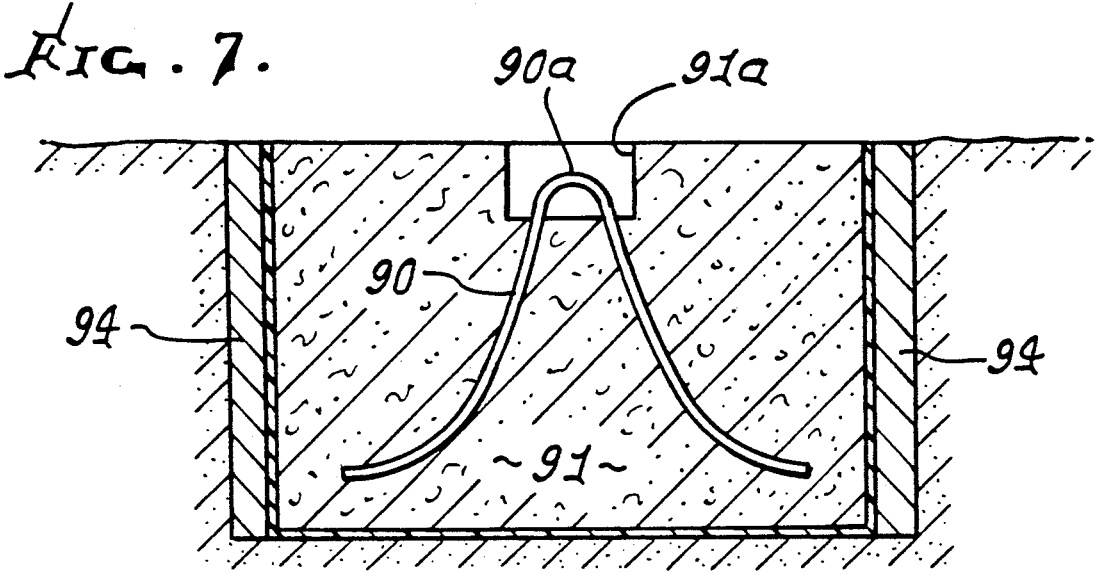
FIG. 7 is a vertical section showing block formation.
Figure 8:
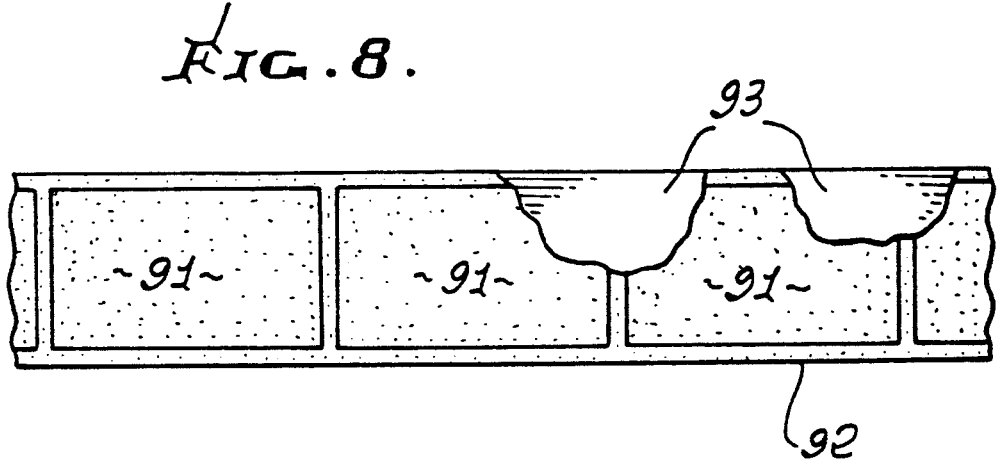
FIG. 8 is a section showing block installation.
Figure 9:
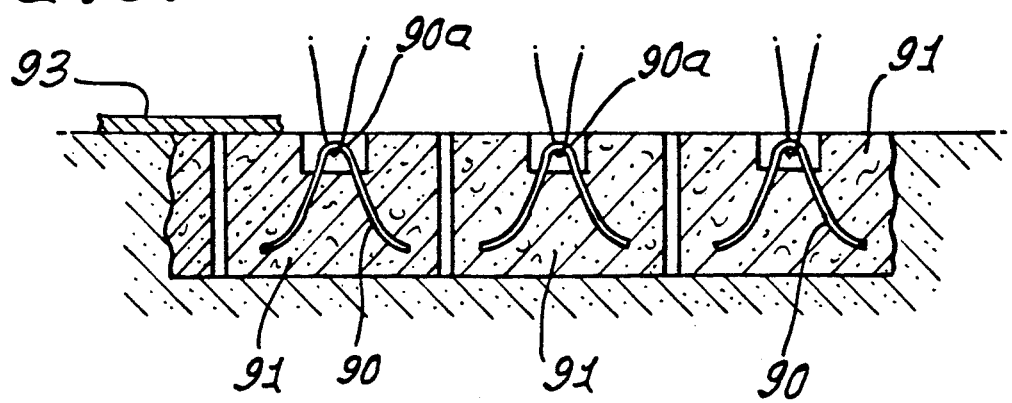
FIG. 9 is a plan view showing installed blocks in supporting relation to a pavement.

FIGS. 7-9 have to do with forming the resultant concrete mix into block shape. FIG. 7 shows the block molding process; FIG. 7 also shows the provision of block support or suspending means, such as steel rods 90 in blocks 91; and FIGS. 8 and 9 show installation of the suspended blocks into a roadbed 92, to be covered by a supported pavement or roadway 93. In FIG. 9 the rods protrude at 90a to form an eye for lifting cable attachment. In FIG. 7, the molded block 91 has a top recess 91a to receive the eye 90a. The steel mold form appears at 94. The steel mold may be removed and set up nearby, as for use on a daily cycle. Thus, blocks could be made at a job site, or other location.

I claim:

1. The method of treating a liquid or solid, waste hydrocarbon consisting essentially of petroleum or derivative thereof contaminating sand or soil, to reduce risk of environmental contamination by said waste hydrocarbon, that includes:
   a) forming a flowable calcareous cementitious aqueous paste,
   b) then introducing said hydrocarbon contaminated sand or soil into paste and distributing in said paste said hydrocarbon contaminated sand or soil, to form a curable mix,
   c) forming said mix into a shape for curing, and
   d) allowing said formed mix to cure so as to encapsulate said hydrocarbon in said cured concrete mix.

2. The method of claim 1 wherein said mix includes Portland cement, water, a wetting agent, and at least one of the following:
   i) sand,
   ii) soil.

3. The method of claim 1 including the step of providing a foam capable of emulsifying hydrocarbon, and at least partially emulsifying said waste hydrocarbon in said foam prior to said c) step.

4. The method of claim 3 wherein said foam consists of one of the following:
   i) methyl cellulose,
   ii) air entraining material.

5. The method of claim 1 including a flowable medium in which said hydrocarbon is distributed and in which said hydrocarbon is introduced into said mix to become a part thereof, said medium including at least one of the following:
   i) soil,
   ii) sand
   iii) soil and sand,
   iv) small pebbles.

6. The method of claim 5 including the step of providing a foam capable of emulsifying hydrocarbon, and at least partially emulsifying said waste hydrocarbon in said foam prior to said c) step.

7. The method of claim 6 including bringing said foam into contact with said medium for contacting and at least partially emulsifying said waste hydrocarbon distributed in said medium.

8. The method of claim 7 including forming a pile of said medium having said hydrocarbon distributed therein, and flowing said foam onto said pile.

9. The method of claim 8 including forming alternate layers of said medium and of said foam in said pile.

10. The method of claim 1 including forming said mix into block shape for curing into solid blocks.

11. The method of claim 5 including forming said mix into block shape for curing into solid blocks.

12. The method of claim 5 including recovering and providing said medium by excavating said medium from a hydrocarbon contaminated underground formation.

13. The method of claim 12 wherein said contaminated underground formation is located beneath a hydrocarbon storage container, and wherein said excavating step includes gaining access to said contaminated underground formation, and scooping it and forming a pile of said scooped medium.

14. The method of claim 13 including the step of providing a foam capable of emulsifying hydrocarbon, and at least partially emulsifying said waste hydrocarbon in said foam prior to said c) step.

15. The method of claim 8 wherein said pile has medium content and including sampling said pile after said foam has been flowed onto said pile, and determining from said sampling said medium content of said pile.

16. The method of claim 15 including using said determined medium content of said pile to formulate said mix.

17. The method of claim 10 including locating said blocks in a row to form supports, and forming a road pavement over said blocks.

18. The method of claim 10 including providing block suspending supports in said block-shaped mix prior to curing thereof.

19. The method of claim 18 wherein said support providing step includes providing steel reinforcing bars in said blocks to project above said blocks for attachment to suspending means.

20. The method of claim 9 including covering said pile with said foam to prevent evaporation of said hydrocarbon into the atmosphere.

21. The method of claim 6 including allowing substantially complete hydration of cement in said cementitious paste prior to contacting said foam with said mix so that emulsification of said hydrocarbon does not prevent said hydration.

* * * * *